United States Patent
Bagnall (10) Patent No.: US 7,021,555 B2
(45) Date of Patent: Apr. 4, 2006

(54) SPRAYING/MISTING FOR PLANTS AND ANIMALS

(75) Inventor: Gary Wayne Bagnall, Arroyo Grande, CA (US)

(73) Assignee: Zoo Med Laboratories, Inc., San Luis Obispo, CA (US)

( * ) Notice: Subject to any disclaimer, the term of this patent is extended or adjusted under 35 U.S.C. 154(b) by 0 days.

(21) Appl. No.: 10/752,646

(22) Filed: Jan. 6, 2004

(65) Prior Publication Data

US 2005/0145712 A1  Jul. 7, 2005

(51) Int. Cl.
*B05B 17/00* (2006.01)

(52) U.S. Cl. ............................. 239/1; 239/67; 239/69; 239/70; 239/99; 239/101; 239/332; 119/604; 119/665

(58) Field of Classification Search .................. 239/67, 239/68, 69, 70, 99, 101, 1, 332; 119/602, 119/603, 604, 665
See application file for complete search history.

(56) References Cited

U.S. PATENT DOCUMENTS

| | | | | |
|---|---|---|---|---|
| 3,542,069 | A | * | 11/1970 | Ollison ................... 137/624.21 |
| 3,739,944 | A | | 6/1973 | Rogerson |
| 3,776,192 | A | | 12/1973 | Stamps et al. |
| 4,060,934 | A | * | 12/1977 | Skaggs ............................. 47/79 |
| 4,415,797 | A | | 11/1983 | Choustoulakis |
| 4,834,265 | A | * | 5/1989 | Snyder ............................. 222/1 |
| 4,860,555 | A | | 8/1989 | Bishop et al. |
| 5,303,563 | A | | 4/1994 | Bishop et al. |
| 5,417,080 | A | | 5/1995 | Bishop |
| 5,493,996 | A | * | 2/1996 | Verschuere et al. ......... 119/604 |
| 5,501,179 | A | | 3/1996 | Cory |
| 5,634,342 | A | * | 6/1997 | Peeters et al. ................. 62/3.4 |
| 5,660,330 | A | * | 8/1997 | Scott ............................. 239/70 |
| 5,813,605 | A | * | 9/1998 | Chou ............................. 239/64 |
| 5,964,403 | A | | 10/1999 | Miller et al. |
| 6,036,108 | A | | 3/2000 | Chen |
| 6,182,904 | B1 | | 2/2001 | Ulczynski et al. |
| 6,592,049 | B1 | * | 7/2003 | Wolput ........................ 239/70 |
| 6,688,257 | B1 | * | 2/2004 | Lee ............................. 119/604 |

OTHER PUBLICATIONS

Mist'r Crisp'r brochure, Hydro-Crisper, Inc., Norcross, Georgia, United States of America, published prior to present invention.

* cited by examiner

*Primary Examiner*—Steven J. Ganey
(74) *Attorney, Agent, or Firm*—Mitchell Silberberg & Knupp LLP (57) ABSTRACT

A method of periodically spraying live plants and/or animals, using a portable electric sprayer, is described and claimed. In the preferred embodiments, the portable electric sprayer includes: (i) a fluid reservoir; (ii) a nozzle for producing a spray of fluid; (iii) a conduit between the fluid reservoir and the nozzle; (iv) an electric pump coupled so as to pump fluid from the reservoir, through the conduit and out of nozzle; and (v) a control panel. In addition, a control circuit in the portable electric sprayer accepts the user settings from the control panel, and activates and deactivates the electric pump when indicated by the user settings. The nozzle is directed so as to provide the sprays toward at least one of: a terrarium, a bird cage, an aviary, a garden or a potted plant, and the portable electric sprayer is allowed to cycle through a plurality of the sprays while unattended.

29 Claims, 4 Drawing Sheets

SPRAYING/MISTING FOR PLANTS AND ANIMALS

BACKGROUND OF THE INVENTION

1. Field of the Invention

The present invention concerns a portable electric mister/sprayer, e.g., for periodically creating a controlled mist and/or spray of water (collectively referred to herein as spraying), as well as the use of the same in terrariums, bird cages, aviaries, indoor gardens and similar applications.

2. Description of the Related Art

Many people enjoy having plants and/or small animals in their homes and/or places of business. As a result, it is fairly common for people to maintain terrariums, bird cages, aviaries, gardens and individual plants. However, providing the best care for such plants and animals often presents particular challenges. In this regard, the present inventor has discovered that it often is very beneficial to periodically spray or mist certain types of small animals (e.g., reptiles and birds that are adapted to life in very humid climates) and plants.

Conventionally, certain special-purpose electrically controlled sprayers have been available. For instance, many supermarkets use electrically controlled sprayers to periodically spray water on their produce in an attempt to keep the produce fresh as long as possible. Such sprayers typically are connected to the pressurized municipal water supply. Similar electrically controlled sprayers are used for irrigation purposes and for watering outdoor residential lawns and gardens. However, such conventional sprayers are ill-suited to this purpose because they require a connection to the municipal water supply.

Although smaller sprayers previously have been proposed, such conventional sprayers have not been configured for, used for, or even contemplated to be used for the purpose of periodically spraying live plants and/or animals. See, e.g., U.S. Pat. Nos. 4,860,555, 5,303,563 and 5,417,080 to Bishop et al., which discuss the use of a small electrical sprayer that is configured for use in a refrigerator-based vegetable crisper for helping to maintain the moisture content (and thereby the freshness and crispness) of picked, stored vegetables.

SUMMARY OF THE INVENTION

In recognition of the foregoing need identified by the present inventor, the present invention concerns the use of a small portable programmable sprayer for spraying individual plants, small gardens and/or animals.

Thus, in one aspect the invention is directed to a method of periodically spraying live plants and/or animals, using a portable electric sprayer that includes: (i) a fluid reservoir; (ii) a nozzle for producing a spray of fluid; (iii) a conduit between the fluid reservoir and the nozzle; and (iv) an electric pump coupled so as to pump fluid from the reservoir, through the conduit and out of nozzle. In addition, the portable electric sprayer has a control panel and is configured to accept user settings that control operation of the electric pump. A control circuit in the portable electric sprayer is electrically coupled to accept the user settings from the control panel, and is configured to activate and deactivate the electric pump when indicated by the user settings. Upon obtaining the portable electric sprayer, the fluid reservoir is at least partially filled with fluid, and the control panel is set to intermittently produce sprays of the fluid. The nozzle is directed so as to provide the sprays toward at least one of: a terrarium, a bird cage, an aviary, a garden or a potted plant, and the portable electric sprayer is allowed to cycle through a plurality of the sprays while unattended.

The foregoing technique often can provide better, easier and less expensive control over humidity and/or moisture. In more particularized aspects of the invention, one or more adjustable nozzles are provided for controlling the spraying characteristics. Preferably, at least one nozzle is detachable, potentially allowing the user to utilize a variety of different spraying nozzles and other attachments. Also, at least one nozzle preferably is attached to a flexible hose, thereby allowing more or less arbitrary positioning of the nozzle irrespective of the orientation of the base unit.

Still further, in the preferred embodiments, the user is allowed to control at least the spray duration and the time interval between spraying events. However, more advanced (e.g., microprocessor-controlled) devices also are contemplated.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
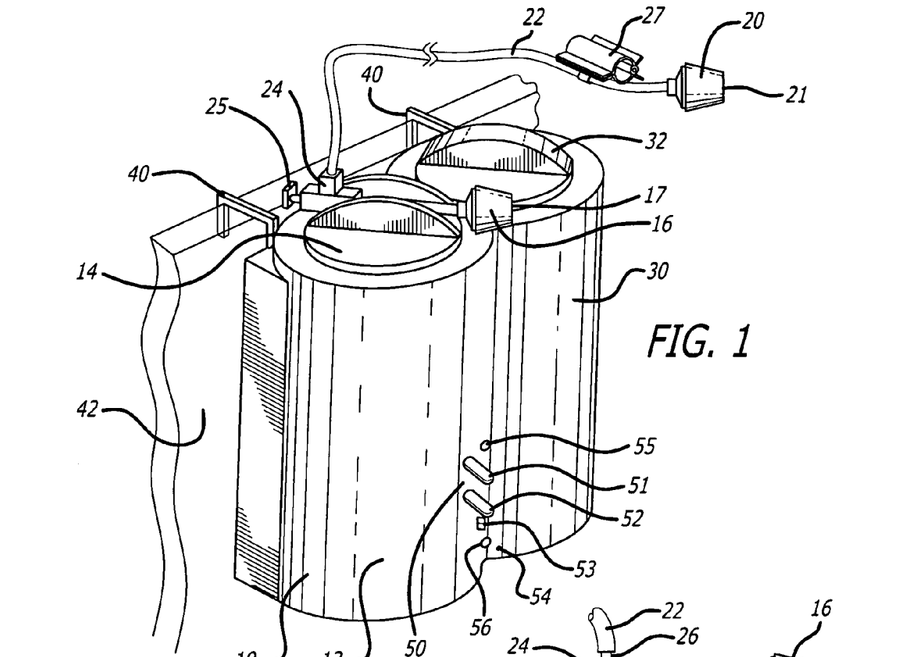
FIG. 1 is a perspective view of a programmable electric sprayer according to the present invention.

FIG. 1 illustrates a perspective view of a portable electric spraying apparatus 10 according to the present intention. From the outside, the general shape of sprayer 10 appears to be a pair of side-by-side cylinders, partially overlapping along their length. On top of the right cylinder 12 is a rotatable disk assembly 14 having a nozzle 16 extending from it. The nozzle 16 has an opening 17 in its front face and may be twisted to control the effective size of the opening, thereby controlling the dispersion of the spray and, at one extreme, turning off the spray altogether.

In the present embodiment of the invention, nozzle 16 is fixed in position, except that it is mounted on disk assembly 14, which itself is able to rotate on top of cylinder 12. However, in other embodiments of the invention, the positioning of nozzle 16 may be more flexible. For example, nozzle 16 may be disposed at the distal end of a fully flexible hose (e.g., formed a flexible plastic or synthetic rubber). Alternatively, nozzle 16 may be at the end of a flexible but shape-retaining conduit, such as is commonly used in gooseneck lamps. This latter arrangement could allow the user complete flexibility in positioning nozzle 16 while ensuring that nozzle 16 would remain substantially stationary once positioned by the user.

In any event, in the present embodiment of the invention a second nozzle 20 is provided and is connected to the main body of sprayer 10 via a flexible hose 22. However, in alternate embodiments of the invention, nozzle 20 may be implemented in any other manner, such as in accordance with any of the variations described above for nozzle 16. In addition, nozzle 20 may be the only nozzle provided on sprayer 10 (with nozzle 16 omitted completely).

Preferably, nozzle 20 is similar to nozzle 16, allowing a user to control the effective size of an opening 21 on the front face of nozzle 20. In addition, a valve 24 is provided on the main body of sprayer 10 for controlling the amount of fluid that is provided to nozzle 20 through hose 22. More specifically, the valve 24 is opened and closed by twisting valve stem 25. It is noted that, although not provided in the current embodiment, a similar valve also may be provided for nozzle 16, and/or a main valve may be provided to control the fluid provided to all of the nozzles utilized by sprayer/mister 10.

Attached to hose 22 is a clip 27 for attaching hose 22 to a desired structure (e.g., the frame of a birdcage) or other object, thereby providing the user with better control over the direction in which the fluid is spray. In the preferred embodiments, clip 27 attaches to hose 22 with the use of two flexible plastic legs that clamp around hose 22, thereby permitting clip 27 to be slid to any position along the length of hose 22 or to be easily attached to and detached from hose 22. However, any other type of clip or other attachment mechanism (e.g., a clamp, a bracket, Velcro or tape) may be utilized for the purpose of attaching hose 22 or nozzle 20 to a terrarium, birdcage or other object.

Preferably, hose 22 is easily detachable from the main body of sprayer 12. In the present embodiment, this is accomplished by providing a short outlet fitting 26 (shown in FIG. 2) that extends from valve 24. Hose 22 then slides onto and off of fitting 26, attaching snugly around fitting 26. Accordingly, hose 22 may be attached and detached relatively easily. However, any other mechanism that permits attachment and detachment (e.g., use of male-threaded and female-threaded fittings), or in fact any mechanism for permanent attachment, instead may be used.

In embodiments where detachment is possible, it is also contemplated that other optional attachments may be utilized in connection with sprayer 10. For instance, an optional attachment (not shown) may have a hose that attaches to fitting 26 and then divides into two separate hoses, each terminating in their own nozzle. As will be readily apparent, the ability to interchange optional attachments in this manner can permit the user to utilize any number of nozzles, as well as any combination of different nozzle types.

On top of the left side cylinder 30 is a removable cover 32 which provides access to a reservoir within sprayer 10 for filling sprayer 10 with water (or any other fluid that is to be sprayed). More specifically, cover 32 may be removed and water or another fluid poured into the reservoir. Once the reservoir is adequately full, cover 32 is replaced. In the present embodiment of the invention, cover 32 is simply snapped on and pulled off (e.g., using an interference fit), but in other embodiments may be screwed on and off, or attached and detached in any other conventional manner.

A pair of hooks 40 is provided on the backside of sprayer 10 and allows sprayer 10 to be hung, e.g., from the top edge of a terrarium or along a horizontal bar of a birdcage. In order to provide the maximum flexibility in this regard, hooks 40 preferably are formed out of a bent steel rod having a relatively small diameter, such as a diameter of ⅛ inch, and extend horizontally out from the main body of sprayer 10 by a significant amount (e.g., approximately 1 inch), in order to accommodate a wide variety of thicknesses for wall 42.

Located on the front of sprayer 10 is a control panel 50 for allowing the user to control various aspects of the spraying. In the present embodiment of the invention, a user has access to two control knobs: a knob 51 for selecting the spray interval from a set of provided choices (e.g., every hour, every three hours, every six hours or every 12 hours) and a knob 52 for selecting the spray duration for each spraying event (e.g., 15 seconds, 30 seconds, 45 seconds or 60 seconds). Thus, this embodiment provides for periodic spraying events at regular intervals, with the interval selected by the user from a set of discrete choices and with the duration of each spraying event also selected by the user from a set of discrete choices. However, as discussed in more detail below, the present invention contemplates a variety of other user interfaces providing different levels of user control over the spraying schedule, spraying event duration and even the spraying characteristics.

Also provided on the front of sprayer 10 is a power switch 53 for turning the unit's power on and off, a power-indication light 54 for indicating when the unit is on, a spray-indication light 55 for indicating when the unit is spraying, and a power jack 56 for inputting power from an external source. The use of simple controls and simple indication lights in this manner is believed to make the entire unit easier and more intuitive to use, as well as to reduce the unit's cost. However, a more complicated user interface may instead be provided, as discussed in more detail below.

Figure 2:
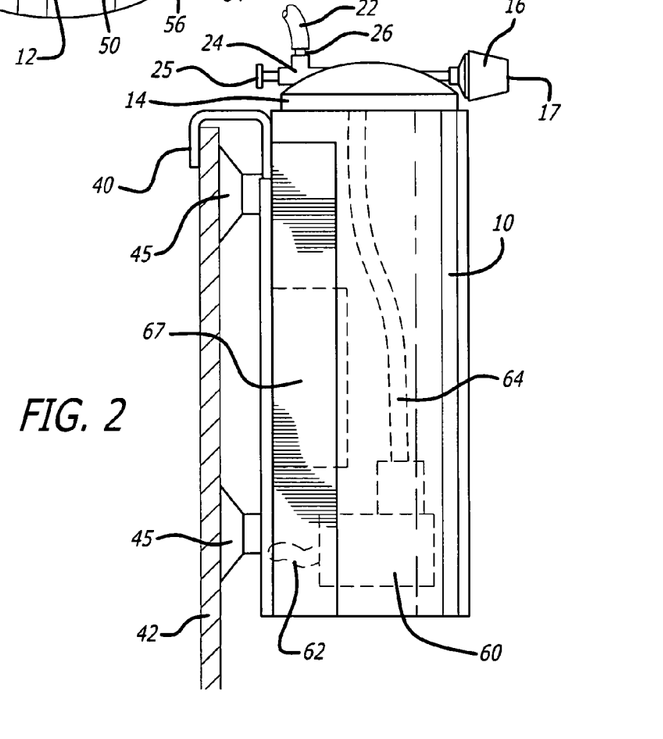
FIG. 2 is a right-side elevational view of the sprayer.

FIG. 2 illustrates a side elevational view of sprayer 10. As shown in FIG. 2, in addition to hooks 40 sprayer 10 includes plural suction cups 45 for attaching the unit to a wall 42. Preferably, four of such suction cups 45 are provided: top left, top right, bottom left and bottom right. However, any other arrangement or number of suction cups 45 may instead be used. Suction cups 45 may be used together with hooks 40 or either may be used separately to secure sprayer 10, as appropriate with respect to the intended placement of the unit.

An electric pump 60 pulls water (or other fluid) in from the reservoir via a hose or other conduit 62 and pumps it through hose (or other conduit) 64 to the disk assembly 14, described above. There, the fluid flows to nozzle 16 and through the valve 24 (if open) to fitting 26. If nozzle 16 is at least partly open, then the fluid will spray out of opening 17. For the fluid to spray out of opening 21, both valve 24 and nozzle 20 must be at least partly open. In the preferred embodiments of the invention, each of conduit 62 and 64 is implemented with a flexible plastic hose. However, any other type of conduit may instead be used.

A battery compartment 67 also is provided for using sprayer 10 in a fully portable battery-operated mode. In the current embodiment of the invention, pump 60 is driven by a 6-volt DC motor. Accordingly, battery compartment 67 preferably is capable of accommodating four 1.5-volt (preferably C-sized) batteries. Similarly, if external power is applied, that power also is 6 volts DC. Optionally, sprayer 10 may be provided with a charging circuit and rechargeable batteries so that external power provided via power jack 56 is used to recharge the unit's batteries, as well as to power the unit during normal operation.

Figure 3:
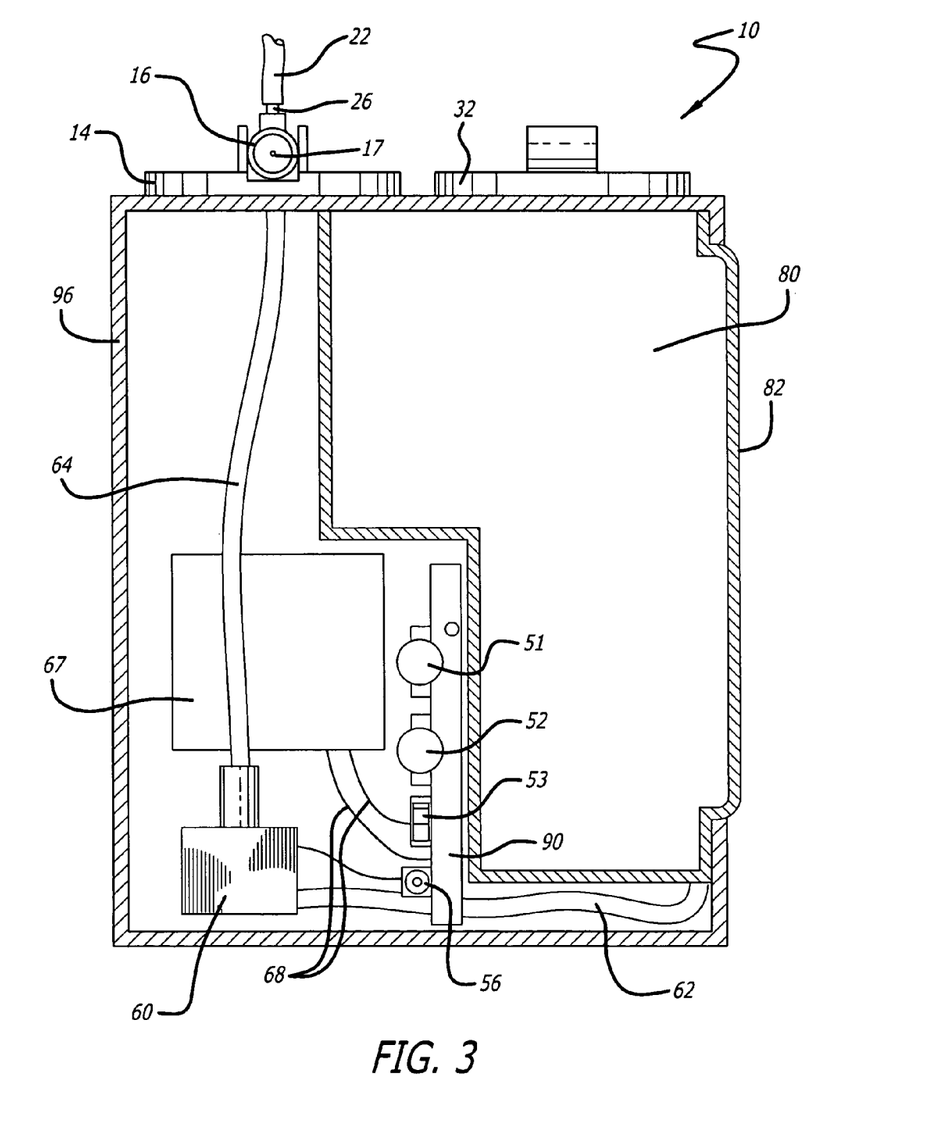
FIG. 3 is a front cross-sectional view of the sprayer.

FIG. 3 illustrates a front cross-sectional view of spraying assembly 10. As shown in FIG. 3, the left side 30 of spraying assembly 10 generally is occupied by reservoir 80, although a portion of reservoir 80 also extends into the right side 12 of sprayer 10. The right side 12 of sprayer 10 generally is occupied by pump 60, battery compartment 67 and circuit board 90, the latter including the necessary control circuitry for implementing the programming functionality specified by the user, as well as the user interface controls 51–53. As shown, circuit board 90 may be powered from power jack 56 or from the batteries installed in battery compartment 67 via the power leads 68 which connect battery compartment 67 to circuit board 90. Preferably, the outer casing 96 of sprayer 10 (which is opaque) has a vertically oriented slot, exposing a portion 82 of the side wall of reservoir 80. In this case, reservoir 80 preferably is made of a see-through material, such as translucent plastic, so that a user can quickly make a visual determination regarding how full reservoir 80 is.

Figure 4:
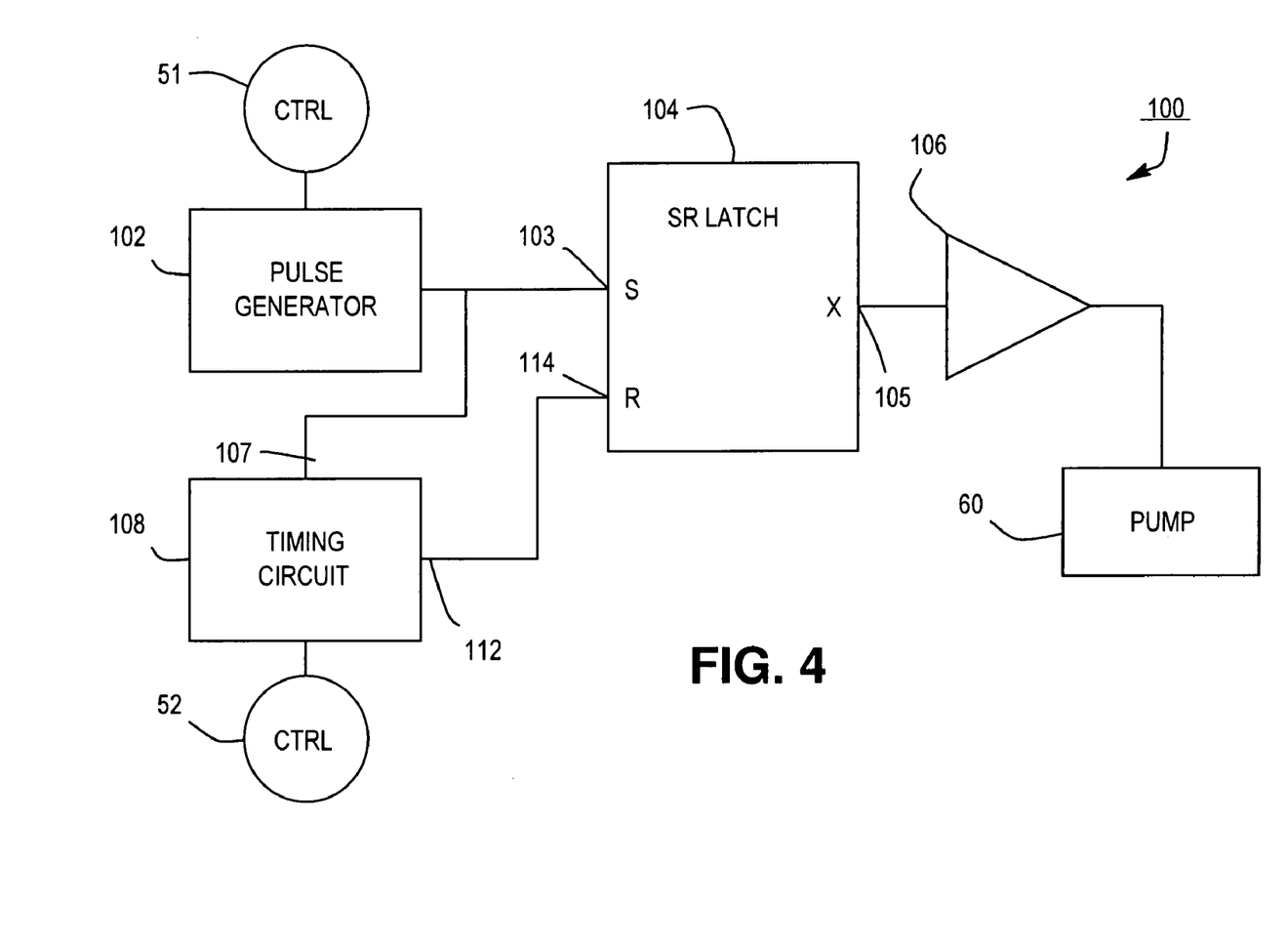
FIG. 4 is a block diagram of the control circuit for controlling the electric pump in a representative embodiment of the present invention.

FIG. 4 is a block diagram of a control circuit 100 (implemented on circuit board 90) for controlling the electric pump 60 in a representative embodiment of the present invention. Included in control circuit 100 is a pulse generator 102 for periodically generating a pulse, with the frequency of the pulse being controlled by control knob 51. Many such pulse generators are commercially available, and a relatively inexpensive pulse generator 102 can be utilized, as precise control over the frequency is not critical. In the present embodiment, control knob 51 functions as a rotating switch, with each of the switch positions selecting a resistor having a different in value. The pulse generator 102 then utilizes the selected resistance (typically in connection with an internal capacitor) to establish the period of time between pulses). In this way, the user is able to select from a number of discrete time intervals between spraying events.

When a pulse is output from pulse generator 102, it is provided both to the "set" input 103 of SR latch 104 and also to the activation input 107 of timing circuit 108. In response to this signal, the output 105 of the SR latch 104 goes high and remains high, thereby driving pump 60 through switch 106.

At the same time, the pulse output from pulse generator 102 also activates timing circuit 108 which, after a specified period of time, outputs a pulse on output line 112. In the present embodiment, the time period of timing circuit 108 is controlled by control knob 52, which functions as a rotating switch, with each of the switch positions selecting a resistor having a different in value. Similar to the operation of a pulse generator 102, the timing period of timing circuit 108 may be determined by a resistive-capacitive circuit, with the resistor selected by control knob 52 and the capacitor being internal to timing circuit 108. In this manner, the user is able to select from a number of different discrete spray duration settings.

The pulse output by timing circuit 108 on line 112 is provided to the "reset" input 114 of SR latch 104. This causes the output 105 of SR latch 104 to return low and remain low, effectively turning off pump 60 through switch 106. It is noted that switch 106 may be an electronic switch or may be implemented as a mechanical relay.

Figure 5:
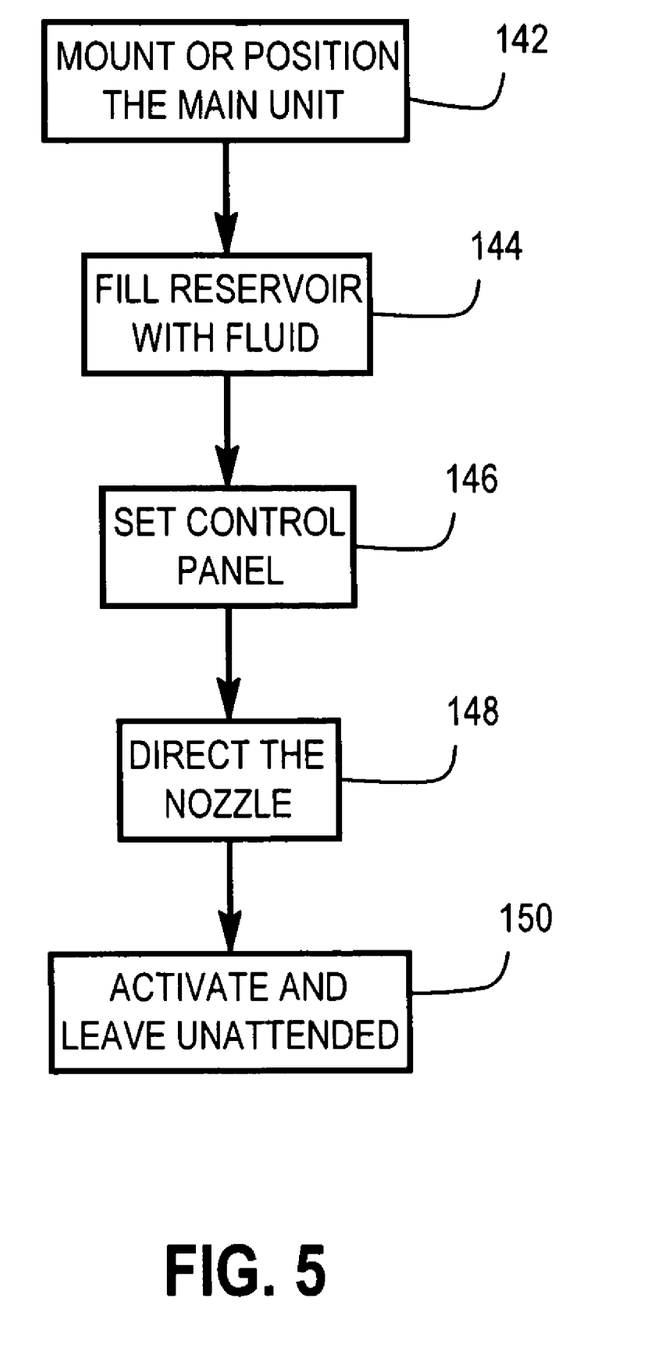
FIG. 5 is a flow diagram illustrating the use of a portable electric sprayer according to the preferred embodiments of the present invention.

FIG. 5 is a flow diagram illustrating the use of a portable electric sprayer 10 according to the preferred embodiments of the present invention. Although the following steps are illustrated and described as being performed in a particular order, such order is merely exemplary. The actual order in which such steps are performed typically may be varied, as will be readily understood by those skilled in the art.

Initially, in step 142 the main unit of the sprayer 10 is positioned (e.g., by simply setting it down) or is mounted (e.g., using the hooks 40 or suction cups 45) near the desired use location.

In step 144, the reservoir 80 is at least partially filled with fluid (e.g., water). This may be accomplished by simply removing cover 32, pouring in water and then replacing cover 32.

In step 146, the control panel 50 is set to the desired spraying parameters. Preferably, the user has any or all of the options described herein for controlling the spraying schedule, duration, interval and/or other characteristics. The specific settings selected by the user generally will be chosen based on the needs of the particular plants or animals to which the spray will be applied.

In step 148, the nozzle(s) 16 and/or 20 are pointed in the direction of the desired plants and/or animals. If nozzle 16 is utilized, this may mean simply rotating nozzle 16 to the correct direction. If nozzle 20 is utilized, this may mean pointing nozzle 20 as desired and/or clipping nozzle 20 to an appropriate object (e.g., using clip 27) in order to maintain this orientation.

In step 150, sprayer 10 is activated (e.g., using power switch 53) and then is left unattended for some period of time during which sprayer 10 will automatically begin and then discontinue spraying in accordance with the user settings. Typically, sprayer 10 may be left unattended for a long period of time, encompassing multiple spraying events, before the user is required to return. Eventually, the user will have to return to refill reservoir 80. In addition, based on the user's observations and/or any changes to the subject plants and/or animals, the user may wish to modify the settings made in step 146 or re-adjust the direction in which the nozzle is (or nozzles are) pointing.

Additional Considerations

As noted above, timing circuit 100 is preferred because it is simple, inexpensive and provides for a relatively simple user interface. One variation on the above embodiment is to replace one or both of controls 51 and 52 with a variable resistor, thereby providing the user with continuous control over the corresponding interval and/or duration of the spraying events.

In addition, a more complicated circuit, with correspondingly more flexible programmability may instead be utilized. For example, a microprocessor-based control circuit generally will be capable of being programmed by the manufacturer and/or by the end user to provide nearly any desired user functionality. In such a case, for example, the user may be given the option of varying the interval and/or duration based upon the time of day (assuming that a real-time clock is utilized).

Still further, such a control circuit may be provided with additional input data that may be digitized and used to control when spraying events occur and the duration of each spraying event. In one representative embodiment, the interval and/or duration may be varied from the nominal value specified by the user based upon the input from a provided temperature sensor, with the amount of such variation either being set by the user or embedded in the manufacturer's programming.

With appropriate control circuitry, it is also possible to input values from a humidity sensor and to use these values in order to control when spraying events occur and how long they last. Such values can be used either in a fully automatic mode (e.g., to maintain a specified humidity level) or as an adjustment factor for making deviations from nominal scheduling parameters (e.g., from a schedule set by the user).

In still further embodiments, multiple temperature sensors, multiple humidity sensors or other types of sensors, as well as any combination of such sensors may be utilized. In addition to using such sensor input to vary the parameters of spraying events, such inputs may be stored and provided to the user in any convenient reporting format. These reports may be helpful in allowing the user to adjust the orientation of the nozzles, the dispersion of the spray from each nozzle and/or the amount of spray from each nozzle.

Use of a more flexible control circuit also may permit the inclusion of a more sophisticated user interfaces, such as a keypad or keyboard for input and/or an alphanumeric display for output. The present invention also contemplates more expensive spraying models that include digital outputs for interfacing with a general-purpose computer, a wireless (e.g., cellular) communications device and/or any other electronic device. Such communications capability may allow for better data-tracking (e.g., where plants or animals being sprayed are being closely studied) through the use of better and/or more customizable report generation, greater flexibility in controlling the spraying schedule and/or characteristics (e.g., through a graphic user interface), and/or remote status notifications (e.g., for emergency notifications or for responding to remote status queries).

It is noted that, by providing one or more electrically controllable valves and/or by varying the power provided to the electric pump 60, the user can be provided with the opportunity to control spray characteristics, as well as the spraying duration and schedule.

In the embodiments described above, hooks and/or suction cups are used to secure the sprayer housing to the wall of a terrarium, to a bird cage or to another surface. In addition, a clip is used to secure the flexible hose 22 that leads to secondary nozzle 20. Generally speaking it will be preferable to provide attachment means for attaching, mounting or hanging any or all of the sprayer housing, flexible hose and the nozzle, so as to achieve flexible placement of such items in accordance with the above-described purposes for the present invention. Such attachment means may include, for example, any combination of suction cups, clips, mounting brackets, screws, hooks, clamps or straps.

Similarly, in the embodiments described above, a flexible hose or a rotation assembly is utilized so as to permit the nozzle to be pointed in any desired direction, independently of the base unit. This goal also may be achieved using other techniques, in addition to or instead of the foregoing techniques. For example, the nozzle may be mounted so as to be capable of pivoting up and down in addition to, or instead of, being able to rotate in a horizontal plane.

In the preferred embodiments of invention, most of the sprayer (e.g., the pump, motor and fluid reservoir) is housed within a single main unit. Components which preferably are outside of this main unit include, for example, a nozzle that attaches to the main unit via a flexible hose and an AC-power supply.

The description above pertains to a sprayer that generally is intended to be used for spraying water in a variety of different applications. However, it should be understood that the device of the present invention also may be used for spraying other types of liquids, such as fertilizers and/or pesticides.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality may be ascribed to a particular module or component. However, unless any particular functionality is described above as being critical to the referenced module or component, functionality may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of periodically spraying live animals, said method comprising:
   (a) obtaining a portable electric sprayer, which includes:
      (i) a fluid reservoir;
      (ii) a nozzle for producing a spray of fluid;
      (iii) a conduit between the fluid reservoir and the nozzle;
      (iv) an electric pump coupled so as to pump fluid from the reservoir, through the conduit and out of nozzle;
      (v) a control panel configured to accept user settings that control operation of the electric pump;
      (vi) a control circuit electrically coupled to accept the user settings from the control panel and configured to activate and deactivate the electric pump when indicated by the user settings; and
      (vii) a battery compartment for inserting at least one battery, whereby the portable electric sprayer may be battery-powered;
   (b) filling the fluid reservoir at least partially full with fluid;
   (c) setting the control panel to intermittently produce sprays of the fluid;
   (d) directing the nozzle so as to provide the sprays toward at least one small animal; and
   (e) allowing the portable electric sprayer to cycle through a plurality of the sprays while unattended,
   wherein the control panel settings made in step (c) are chosen based on known needs of the at least one small animal to which the spray is to be applied.

2. A method according to claim 1, further comprising a step of adjusting the nozzle to control dispersion of the sprays of fluid out of the nozzle.

3. A method according to claim 1, further comprising a step of using the control panel to specify duration of the sprays and an amount of time between the sprays.

4. A method according to claim 1, further comprising a step of using the control panel to select a time interval at which the sprays periodically are to occur.

5. A method according to claim 1, further comprising a step of using the control panel to select a duration of the sprays.

6. A method according to claim 5, further comprising a step of using the control panel to select a time interval at which the sprays periodically are to occur.

7. A method according to claim 1, further comprising a step of using the control panel to specify a spraying schedule that includes plural spraying events.

8. A method according to claim 7, further comprising a step of using the control panel to specify at least one aspect of the spraying events.

9. A method according to claim 1, wherein a spray direction of the nozzle is independently adjustable.

10. A method according to claim 1, wherein the fluid reservoir, the electric pump and the control circuit are enclosed within a single housing.

11. A method according to claim 1, wherein the at least one small animal comprises a reptile.

12. A method according to claim 1, wherein the at least one small animal comprises a bird.

13. A method according to claim 1, further comprising steps of:
   (f) observing the at least one small animal after a period of spraying; and
   (g) based on the observations in step (f), at least one of modifying the settings made in step (c) or redirecting the nozzle.

14. A method according to claim 1, wherein the electric pump and the fluid reservoir are contained within a main unit of the portable electric sprayer, and wherein the nozzle is disposed at a distal end of a flexible hose that is attached to the main unit, thereby permitting arbitrary positioning of the nozzle, independent of the main unit.

15. A method of periodically spraying live animals, said method comprising:
   (a) obtaining a portable electric sprayer, which includes:
      a fluid reservoir;
      (ii) a nozzle for producing a spray of fluid;
      (iii) a conduit between the fluid reservoir and the nozzle;
      (iv) an electric pump coupled so as to pump fluid from the reservoir, through the conduit and out of nozzle;
      (v) a control panel configured to accept user settings that control operation of the electric pump; and
      (vi) a control circuit electrically coupled to accept the user settings from the control panel and configured to activate and deactivate the electric pump when indicated by the user settings;
   (b) filling the fluid reservoir at least partially full with fluid;
   (c) setting the control panel to intermittently produce sprays of the fluid;
   (d) directing the nozzle so as to provide the sprays toward at least one small animal; and
   (e) allowing the portable electric sprayer to cycle through a plurality of the sprays while unattended,
   wherein the control panel settings made in step (c) are chosen based on known needs of the at least one small animal to which the spray is to be applied, and
   wherein the electric pump and the fluid reservoir are contained within a main unit of the portable electric sprayer, and wherein the nozzle is disposed at a distal end of a flexible hose that is attached to the main unit, thereby permitting arbitrary positioning of the nozzle, independent of the main unit.

16. A method according to claim 15, wherein the portable electric sprayer includes a valve disposed between the fluid reservoir and the second nozzle for controlling the sprays out of the nozzle.

17. A method according to claim 16, wherein the nozzle includes a second valve for controlling the sprays out of the nozzle.

18. A method according to claim 15, wherein the flexible hose is readily detachable from the main unit.

19. A method according to claim 15, further comprising a step of adjusting the nozzle to control at least one of an amount or a dispersion of the sprays of fluid out of the nozzle.

20. A method according to claim 15, wherein the portable electric sprayer further includes a second nozzle and at least one valve configured to control the sprays through the nozzle and the second nozzle.

21. A method according to claim 20, wherein the second nozzle is mounted to the main unit of the portable electric sprayer.

22. A method according to claim 15, further comprising a step of attaching at least one of the nozzle or the flexible hose to another object, using a clip, so as to maintain the position of the nozzle in a selected direction.

23. A method according to claim 15, further comprising a step of using the control panel to select a time interval at which the sprays periodically are to occur.

24. A method according to claim 15, further comprising a step of using the control panel to select a duration of the sprays.

25. A method according to claim 15, wherein the portable electric sprayer includes attachment means for at least one of hanging the portable electric sprayer or attaching the portable electric sprayer to at least one of a terrarium or a bird cage.

26. A method of periodically spraying live animals, said method comprising:
   (a) obtaining a portable electric sprayer, which includes:
      (i) a fluid reservoir;
      (ii) a nozzle for producing a spray of fluid;
      (iii) a conduit between the fluid reservoir and the nozzle;
      (iv) an electric pump coupled so as to pump fluid from the reservoir, through the conduit and out of nozzle;
      (v) a control panel configured to accept user settings that control operation of the electric pump; and
      (vi) a control circuit electrically coupled to accept the user settings from the control panel and configured to activate and deactivate the electric pump when indicated by the user settings;
   (b) filling the fluid reservoir at least partially full with fluid;
   (c) setting the control panel to intermittently produce sprays of the fluid;
   (d) hanging the portable electric sprayer using at least one of a hook and a suction cup;
   (e) directing the nozzle so as to provide the sprays toward at least one small animal; and
   (f) allowing the portable electric sprayer to cycle through a plurality of the sprays while unattended,
   wherein the control panel settings made in step (c) are chosen based on known needs of the at least one small animal to which the spray is to be applied.

27. A method of periodically spraying live animals, said method comprising:
   (a) obtaining a portable electric sprayer, which includes:
      (i) a fluid reservoir;

(ii) a nozzle for producing a spray of fluid;

(iii) a conduit between the fluid reservoir and the nozzle;

(iv) an electric pump coupled so as to pump fluid from the reservoir, through the conduit and out of nozzle;

(v) a control panel configured to accept user settings that control operation of the electric pump; and (vi) a control circuit electrically coupled to accept the user settings from the control panel and configured to activate and deactivate the electric pump when indicated by the user settings;

(b) filling the fluid reservoir at least partially full with fluid;

(c) setting the control panel to intermittently produce sprays of the fluid;

(d) directing the nozzle so as to provide the sprays toward at least one small animal; and (e) allowing the portable electric sprayer to cycle through a plurality of the sprays while unattended, wherein the control panel settings made in step (c) are chosen based on known needs of the at least one small animal to which the spray is to be applied, and wherein the portable electric sprayer weighs less than 3 pounds when the fluid reservoir is empty and no battery is inserted.

28. A method of periodically spraying live animals, said method comprising:

(a) obtaining a portable electric sprayer, which includes:
  (i) a fluid reservoir;
  (ii) a nozzle for producing a spray of fluid;
  (iii) a conduit between the fluid reservoir and the nozzle;
  (iv) an electric pump coupled so as to pump fluid from the reservoir, through the conduit and out of nozzle;
  (v) a control panel configured to accept user settings that control operation of the electric pump; and
  (vi) a control circuit electrically coupled to accept the user settings from the control panel and configured to activate and deactivate the electric pump when indicated by the user settings;

(b) filling the fluid reservoir at least partially full with fluid;

(c) setting the control panel to intermittently produce sprays of the fluid;

(d) directing the nozzle so as to provide the sprays toward at least one small animal; and (e) allowing the portable electric sprayer to cycle through a plurality of the sprays while unattended, wherein the control panel settings made in step (c) are chosen based on known needs of the at least one small animal to which the spray is to be applied, and wherein the portable electric sprayer includes plural suction cups for attaching the portable electric sprayer to a wall.

29. A method of periodically spraying live animals, said method comprising:

(a) obtaining a portable electric sprayer, which includes:
  (i) a fluid reservoir;
  (ii) a nozzle for producing a spray of fluid;
  (iii) a conduit between the fluid reservoir and the nozzle;
  (iv) an electric pump coupled so as to pump fluid from the reservoir, through the conduit and out of nozzle;
  (v) a control panel configured to accept user settings that control operation of the electric pump; and
  (vi) a control circuit electrically coupled to accept the user settings from the control panel and configured to activate and deactivate the electric pump when indicated by the user settings;

(b) filling the fluid reservoir at least partially full with fluid;

(c) setting the control panel to intermittently produce sprays of the fluid;

(d) directing the nozzle so as to provide the sprays toward at least one small animal; and (e) allowing the portable electric sprayer to cycle through a plurality of the sprays while unattended, wherein the control panel settings made in step (c) are chosen based on known needs of the at least one small animal to which the spray is to be applied, and wherein the portable electric sprayer includes attachment means for at least one of hanging the portable electric sprayer or attaching the portable electric sprayer to at least one of a terrarium or a bird cage.

* * * * *

UNITED STATES PATENT AND TRADEMARK OFFICE
CERTIFICATE OF CORRECTION

PATENT NO. : 7,021,555 B2 Page 1 of 1
APPLICATION NO. : 10/752646
DATED : April 4, 2006
INVENTOR(S) : Gary Wayne Bagnall It is certified that error appears in the above-identified patent and that said Letters Patent is hereby corrected as shown below:

Column 9, line 38: Change "a fluid reservoir;" to --(i) a fluid reservoir;--

Signed and Sealed this

Third Day of October, 2006

JON W. DUDAS
*Director of the United States Patent and Trademark Office*